US012638248B2

(12) United States Patent
Duong et al.

(10) Patent No.: US 12,638,248 B2
(45) Date of Patent: May 26, 2026

(54) TUNABLE THERMAL TRANSFER WITHIN AN OSCILLATING HEAT PIPE

(71) Applicant: Raytheon Company, Waltham, MA (US)

(72) Inventors: Tuan Duong, Goleta, CA (US); James S. Wilson, Dallas, TX (US); Miad Yazdani, East Hartford, CT (US)

(73) Assignee: RAYTHEON COMPANY, Waltham, MA (US)

( * ) Notice: Subject to any disclaimer, the term of this patent is extended or adjusted under 35 U.S.C. 154(b) by 599 days.

(21) Appl. No.: 18/067,067

(22) Filed: Dec. 16, 2022

(65) Prior Publication Data

US 2024/0200880 A1     Jun. 20, 2024

(51) Int. Cl.
*F28D 15/06* (2006.01)
*F16K 31/00* (2006.01)
*F16K 31/06* (2006.01)

(52) U.S. Cl.
CPC ............ *F28D 15/06* (2013.01); *F16K 31/002* (2013.01); *F16K 31/06* (2013.01)

(58) Field of Classification Search
CPC ................. F28D 15/0266; F28D 15/06; F28D 2215/022; F28D 15/00; F28D 15/02; F28D 15/0233; F28D 15/025; F16K 15/03; F16K 15/031; F16K 15/033; F16K 31/06; F16K 31/0679
USPC ........................................ 165/104.21–104.29
See application file for complete search history.

(56) References Cited

U.S. PATENT DOCUMENTS

| | | | | |
|---|---|---|---|---|
| 3,543,839 | A | * 12/1970 | Shlosinger | .......... F28D 15/0266 165/274 |
| 3,602,429 | A | * 8/1971 | Levedahl | ................ F28D 15/06 237/9 R |
| 4,175,697 | A | 11/1979 | Dreibelbis | |
| 4,183,466 | A | 1/1980 | Dreibelbis | |
| 4,230,173 | A | * 10/1980 | Eastman | ............. F28D 15/0266 165/274 |
| 4,921,041 | A | * 5/1990 | Akachi | ................... F28D 15/00 165/47 |
| 4,982,895 | A | 1/1991 | Shimizu et al. | |
| 5,419,133 | A | 5/1995 | Schneider | |

(Continued)

FOREIGN PATENT DOCUMENTS

| | | | | |
|---|---|---|---|---|
| DE | 19918007 A1 | * 10/2000 | ......... | F16K 31/0682 |
| JP | 2010156533 A | * 7/2010 | ......... | F28D 15/0266 |

*Primary Examiner* — Jianying C Atkisson
*Assistant Examiner* — For K Ling
(74) *Attorney, Agent, or Firm* — CANTOR COLBURN LLP

(57) ABSTRACT

A tunable oscillating heat pipe system that includes an oscillating closed loop heat pipe configured for movement of a fluid in an internal passage in the closed loop to transfer heat from a first portion of the closed loop to a second portion. The heat pipe system further includes a valve arranged in a section of the internal passage movable between an open position and a closed position. In the open position, the valve is arranged to permit movement of the fluid in the internal passage and in the closed position, the valve is arranged in the internal passage to limit movement of the fluid in a part of the internal passage. Movement of the valve between the open position and the closed position can be a function of at least one of temperature at the first portion, temperature at the second portion, or temperature at the valve.

20 Claims, 8 Drawing Sheets

(56) References Cited

U.S. PATENT DOCUMENTS

| | | | | |
|---|---|---|---|---|
| 6,397,944 B1 * | 6/2002 | Caldwell | ................. | F28F 27/02 |
| | | | | 165/100 |
| 8,066,198 B2 | 11/2011 | Palanchon et al. | | |
| 10,215,501 B1 | 2/2019 | Reist et al. | | |
| 2003/0037910 A1 * | 2/2003 | Smyrnov | ................ | F28D 15/06 |
| | | | | 165/104.21 |
| 2003/0192674 A1 * | 10/2003 | Ippoushi | .............. | H01L 23/427 |
| | | | | 165/104.21 |
| 2006/0279706 A1 * | 12/2006 | Bash | ..................... | G03B 21/18 |
| | | | | 353/54 |
| 2008/0276605 A1 | 11/2008 | Miyagawa et al. | | |
| 2009/0323276 A1 * | 12/2009 | Mongia | ................... | G06F 1/203 |
| | | | | 361/679.52 |
| 2011/0088907 A1 * | 4/2011 | Xu | ........................ | F16K 31/084 |
| | | | | 166/332.8 |
| 2014/0124164 A1 | 5/2014 | Campbell et al. | | |
| 2021/0168970 A1 | 6/2021 | Chehade et al. | | |

* cited by examiner

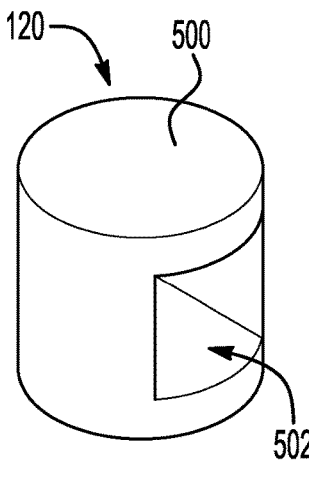
FIG. 5
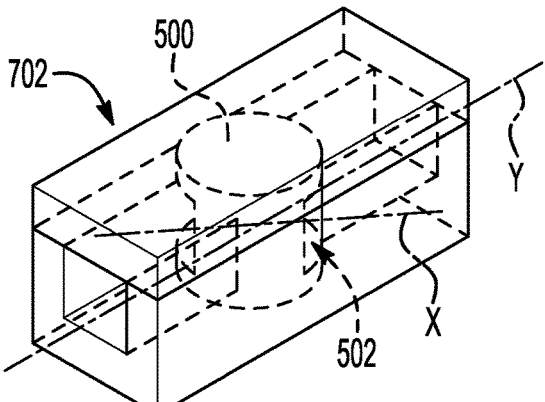
FIG. 6
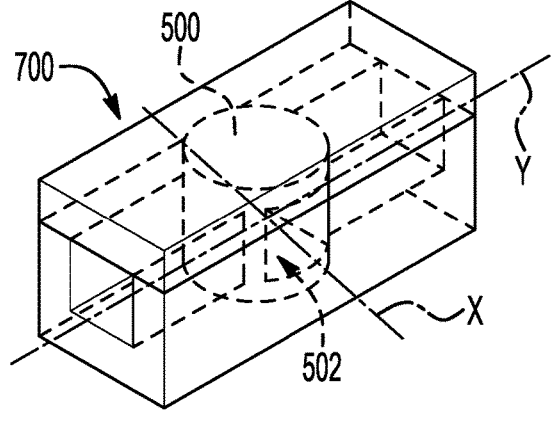
FIG. 7a
FIG. 7b
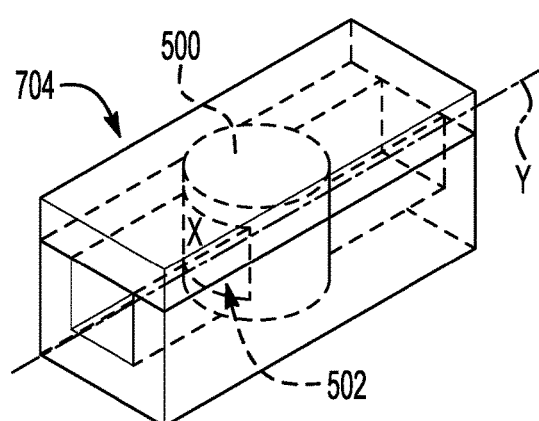
FIG. 7c

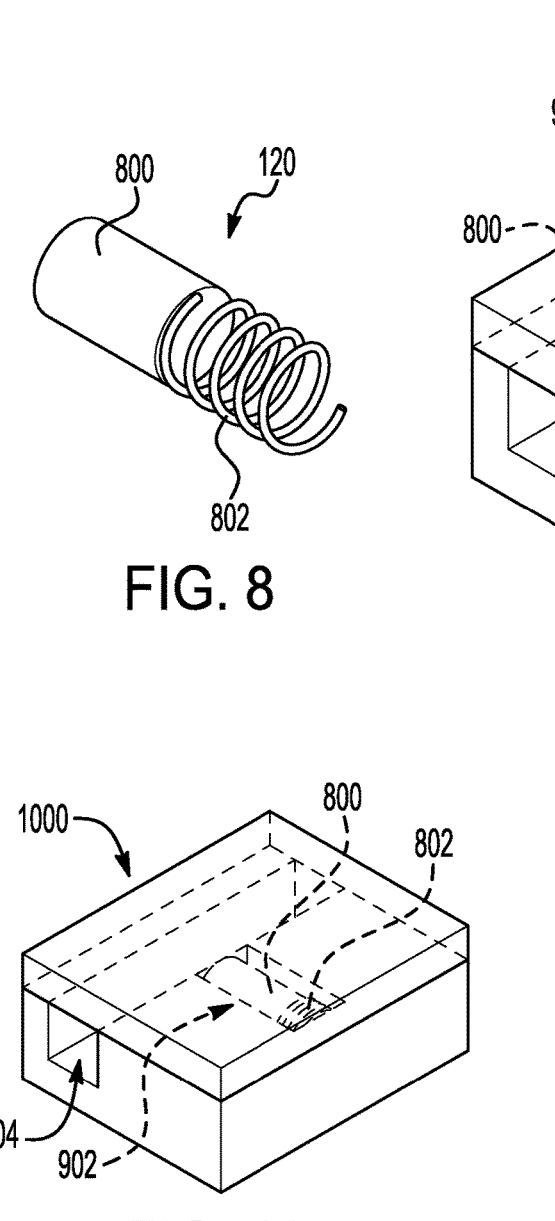
FIG. 8
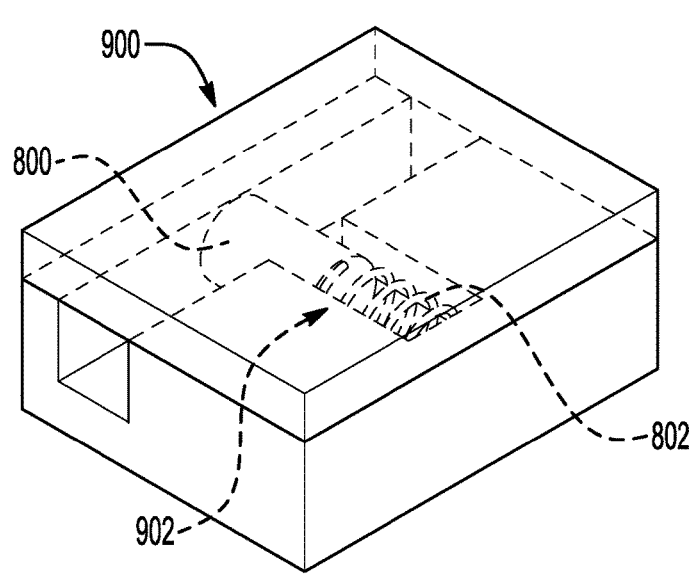
FIG. 9
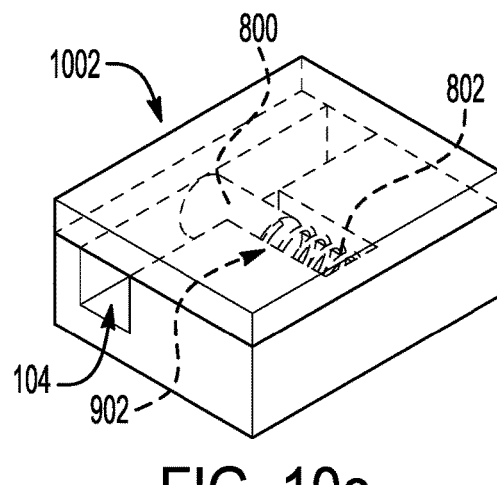
FIG. 10a
FIG. 10c
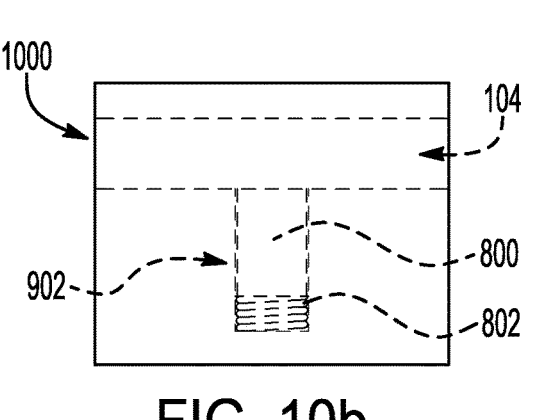
FIG. 10b
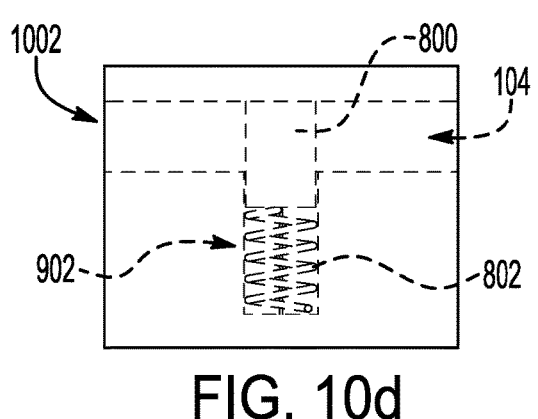
FIG. 10d 1702 MOVE A VALVE IN A HEAT PIPE FROM AN OPEN POSITION TO A CLOSED POSITION TO LIMIT MOVEMENT OF FLUID IN THE HEAT PIPE 1704 MOVE THE VALVE FROM THE CLOSED POSITION TO THE OPEN POSITION TO PERMIT MOVEMENT OF THE FLUID IN THE HEAT PIPE

TUNABLE THERMAL TRANSFER WITHIN AN OSCILLATING HEAT PIPE

FIELD OF DISCLOSURE

The disclosure relates to oscillating heat pipe systems.

DESCRIPTION OF RELATED ART

Oscillating heat pipe systems (OHP) are two-phase passive heat spreaders that transport the heat from a heat source to a heat sink through oscillatory/circulatory motion of liquid slugs and vapor plugs in a loop. As heat is applied to a first portion of the pipe, the liquid begins to evaporate which causes an increase of vapor pressure inside the pipe causing the bubbles in the first portion to grow and push the liquid towards the heat sink. As the heat sink absorbs the heat from the fluid and cools the fluid, the vapor pressure reduces in a second portion which increases a pressure difference between the first portion and the second portion and results in the oscillating motion between the heat source and the heat sink.

SUMMARY

However, traditional oscillating heat pipe systems are often subject to certain operational constraints. Because oscillating heat pipe systems are passive systems that just rely on the pressure difference between different portions of the pipe to move the fluid, there is no active ability to substantially inhibit heat transfer that occurs from normal operation of the oscillating heat pipe system when a temperature of the heat sink is outside a predetermined range. For instance, where the temperature of the heat sink is above a temperature of the heat source, the temperature difference may cause heat to be directed toward the heat source instead of away from it.

A tunable oscillating heat pipe system includes one or more actuating valves within the passage space to control fluid flow occurring within the heat pipe system. Such a valve can transition between an open position that allows unrestricted fluid flow within the heat pipe system and a closed position that limits and/or prevents fluid flow within the heat pipe system. Valve transitions can be influenced through passive techniques or actively, through a feedback control system that continuously samples the temperatures of one or more components of the heat pipe system. By transitioning the valve to control fluid flow, the tunable heat pipe system described herein can prevent undesirable heat transfer.

According to an aspect of the disclosure, an oscillating heat pipe system comprises an oscillating closed loop heat pipe configured for movement of a fluid in an internal passage in the closed loop to transfer heat from a first portion of the closed loop to a second portion; and a valve arranged in a section of the internal passage, wherein the valve transitions between an open position and a closed position, wherein in the open position the valve is arranged to permit movement of the fluid in the internal passage, wherein in the closed position the valve is arranged in the internal passage to limit movement of the fluid in a part of the internal passage, wherein the transition of the valve between the open position and the closed position is a function of at least one of temperature at the first portion, temperature at the second portion, or temperature at the valve.

Exemplary embodiments may include one or more of the following additional features, separately or in any combination.

According to an embodiment of any paragraph(s) of this summary, further including a magnet or magnetic material portion of configured to selectively generate a magnetic field between the magnet and a corresponding valve magnet or magnetic material portion of the valve to transition the valve.

According to an embodiment of any paragraph(s) of this summary, further including a second magnet configured to selectively generate a second magnetic field between the second magnet and the valve magnet or magnetic material portion of the valve to move the valve, wherein the magnet and the second magnet are configured to alternatingly generate the magnetic field and the second magnetic field to move the valve between the open position and the closed position.

According to an embodiment of any paragraph(s) of this summary, wherein the magnet is arranged within a wall of the closed loop heat pipe in the section of the internal passage.

According to an embodiment of any paragraph(s) of this summary, wherein the heat pipe forms a serpentine flow path for the fluid.

According to an embodiment of any paragraph(s) of this summary, wherein the valve is a shutter that rotates about a pivot point between the open position and the closed position, wherein the shutter in the open position is perpendicular to the shutter in the closed position.

According to an embodiment of any paragraph(s) of this summary, wherein the valve is a cylinder with an aperture extending therethrough.

According to an embodiment of any paragraph(s) of this summary, wherein a central axis of the aperture is aligned with a fluid flow path of the section of the closed loop heat pipe in the open position, wherein the central axis of the aperture is perpendicular to the fluid flow path of the section of the closed loop heat pipe in the closed position.

According to an embodiment of any paragraph(s) of this summary, wherein the valve is a plunger attached to a spring, wherein the spring is compressed in the open position, wherein the spring is expanded in the closed position.

According to an embodiment of any paragraph(s) of this summary, wherein the spring is made of thermally activated material configured to expand or contract in response to a temperature of the spring being above a predetermined threshold.

According to an embodiment of any paragraph(s) of this summary, wherein an internal wall of the closed loop heat pipe includes a hollow space in the section of the internal passage of the closed loop heat pipe, wherein the plunger and spring are entirely held within the hollow space in the open position.

According to an embodiment of any paragraph(s) of this summary, wherein the section of the internal passage has a first cross-sectional area, wherein the valve has a second cross-sectional area.

According to an embodiment of any paragraph(s) of this summary, wherein the first cross-sectional area and the second cross-sectional area are the same such that the valve in the closed position completely blocks the section of the internal passage.

According to an embodiment of any paragraph(s) of this summary, further comprising a second valve arranged in a second section of the internal passage, wherein the second valve transitions between a second open position and a second closed position as a function of at least one of temperature at the first portion or temperature at the second portion.

According to another aspect of the disclosure, a tunable oscillating heat pipe system comprises a heat source; a heat sink configured to absorb heat; an oscillating closed loop heat pipe with a first portion of the heat pipe arranged adjacent the heat source and a second portion of the heat pipe arranged adjacent the heat sink, wherein the heat pipe is configured for movement of a fluid in an internal passage in the closed loop to transfer heat from a first portion of the closed loop to a second portion; and a valve arranged in a section of the internal passage, wherein the valve transitions between an open position and a closed position, wherein in the open position the valve is arranged to permit movement of the fluid in the internal passage, wherein in the closed position the valve is arranged in the internal passage to limit movement of the fluid in a part of the internal passage, wherein the transition of the valve between the open position and the closed position is a function of at least one of temperature at the first portion, temperature at the second portion, or temperature at the plug.

Exemplary embodiments may include one or more of the following additional features, separately or in any combination.

According to an embodiment of any paragraph(s) of this summary, further comprising a second heat source, wherein the heat pipe has a third portion arranged adjacent the second heat source, wherein the valve is arranged to limit movement of the fluid between the heat source and the heat sink.

According to an embodiment of any paragraph(s) of this summary, further comprising a control system configured to transition the valve between the open position and the closed position as the function of at least one of temperature at the first portion or temperature at the second portion.

According to an embodiment of any paragraph(s) of this summary, further comprising a second valve arranged in a second section of the internal passage, wherein the second valve transitions between a second open position and a second closed position as a function of at least one of temperature at the first portion or temperature at the second portion.

According to an embodiment of any paragraph(s) of this summary, further comprising a second heat sink configured to absorb heat, wherein the heat pipe has a third portion arranged adjacent the second heat sink, wherein the valve is arranged to limit movement of the fluid between the heat source and the heat sink.

According to a further aspect of the disclosure, a valve for a tunable oscillating heat pipe system comprises a valve body arranged within an internal passage of an oscillating closed loop heat pipe, wherein the valve body is movable between an open position where the valve body is positioned to permit movement of fluid in the internal position and a closed position where the valve body is positioned to limit movement of the fluid in the internal passage, wherein the valve body has a cross-section shaped to completely block the internal passage in the closed position; and a movement device configured to move the valve body between the open position and the closed position.

Exemplary embodiments may include one or more of the following additional features, separately or in any combination.

According to an embodiment of any paragraph(s) of this summary, wherein the valve body is a shutter that rotates about a pivot point, wherein the movement device comprises a first magnet configured to selectively generate a first magnetic field between the first magnet and a corresponding valve magnet or magnetic material portion of the shutter to move the shutter; and a second magnet configured to selectively generate a second magnetic field between the second magnet and the valve magnet or magnetic material portion of the shutter to move the shutter, wherein the first magnet and the second magnet are configured to alternatingly generate the first magnetic field and the second magnetic field to move the shutter between the open position and the closed position.

According to a yet further aspect of the disclosure, a method of operating a tunable oscillating heat pipe system comprises transitioning a valve arranged in an internal passage of a heat pipe of the oscillating heat pipe from an open position to a closed position as a function of at least one of temperature at a first portion of the pipe, temperature at a second portion of the pipe, or temperature at the valve, wherein in the open position the valve is arranged to permit movement of fluid in the internal passage, wherein in the closed position the valve is arranged in the internal passage to limit movement of the fluid in a part of the internal passage; and transitioning the valve from the closed position to the open position to permit movement of the fluid in the internal passage again as a function of at least one of temperature at a first portion of the pipe, temperature at a second portion of the pipe, or temperature at the valve.

Exemplary embodiments may include one or more of the following additional features, separately or in any combination.

According to an embodiment of any paragraph(s) of this summary, wherein transitioning the valve from the open position to the closed position includes activating a magnet to generate a magnetic field between the magnet and a corresponding valve magnet or magnetic material portion of the valve to move the valve.

According to an embodiment of any paragraph(s) of this summary, wherein transitioning the valve from the closed position to the open position includes activating a second magnet to generate a second magnetic field between the second magnet and the corresponding valve magnet or magnetic material portion of the valve to move the valve.

To the accomplishment of the foregoing and related ends, the disclosure comprises the features hereinafter fully described and particularly pointed out in the claims. The following description and the annexed drawings set forth in detail certain illustrative embodiments of the disclosure. These embodiments are indicative, however, of but a few of the various ways in which the principles of the disclosure may be employed. Other objects, advantages and novel features of the disclosure will become apparent from the following detailed description when considered in conjunction with the drawings.

BRIEF DESCRIPTION OF DRAWINGS

The annexed drawings, which are not necessarily to scale, show various aspects of the disclosure.

FIG. 5 is a view of another turnstile-type valve according to another embodiment of the disclosure.

FIG. 6 is a view of the turnstile-type valve of FIG. 5 in a section of pipe according to another embodiment of the disclosure.

FIGS. 7a-7c are views of the turnstile-type valve of FIG. 5 moving between a closed position and an open position according to another embodiment of the disclosure.

FIG. 8 is a view of a plunger-type valve according to a further embodiment of the disclosure.

FIG. 9 is a view of the plunger-type valve of FIG. 8 in a section of pipe according to a further embodiment of the disclosure.

FIGS. 10a-10d are views of the plunger-type valve of FIG. 8 moving between an open position and a closed position according to a further embodiment of the disclosure.

DETAILED DESCRIPTION

Figure 1:
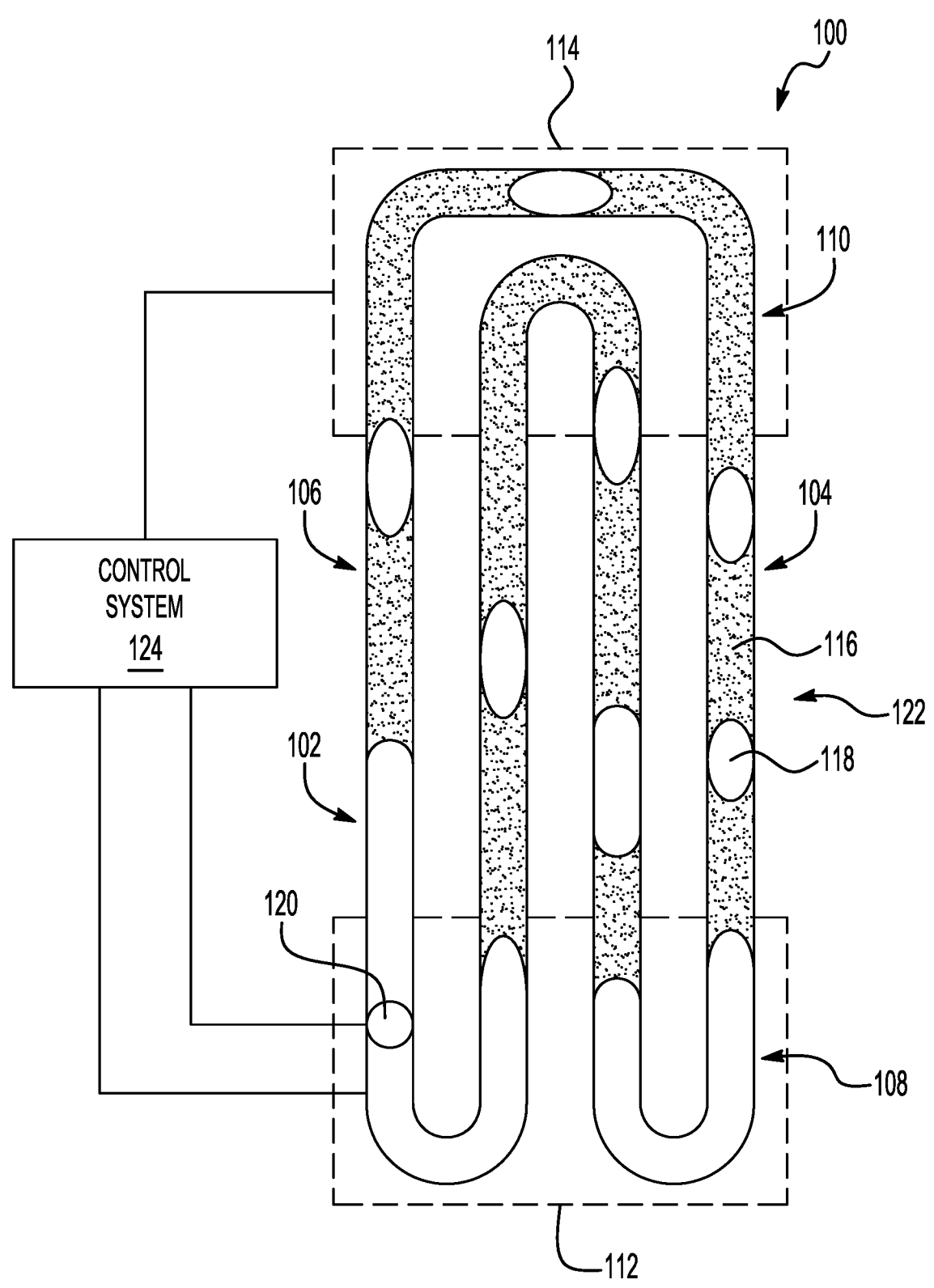
FIG. 1 is a view of a tunable oscillating heat pipe system with a movable valve according to an embodiment of the disclosure.

Aspects of the present application pertain to a tunable oscillating heat pipe system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Disclosed is a tunable oscillating heat pipe system that includes one or more transitioning valves to control fluid flow within the heat pipe system. The valve can transition or move (which are used herein to describe the same movement of the valve) between an open position that allows unrestricted fluid flow within the heat pipe system and a closed position that limits and/or prevents fluid flow within the heat pipe system. Valve transitions occur based on a temperature of one or more components of the heat pipe system. By transitioning the valve to control fluid flow, the heat pipe system described herein can prevent undesirable heat transfer by the fluid.

Turning now to FIG. 1, a tunable oscillating heat pipe system (T-OHP) 100 is illustrated that includes a pipe 102 with an internal passage 104 shaped to permit movement of fluid 106 within the pipe 102. The fluid 106 can be liquid, gas, and/or the like. Exemplary working fluid 106 can include, water, acetone, an alcohol (such as ethanol, methanol, or the like), a mixture of different fluids, and/or the like. As noted above, a heat pipe is a heat-transfer device that uses a phase transition to transfer heat between two interfaces. In the illustrated embodiment, a first portion 108 of the pipe 102 is arranged adjacent a first device that generates heat (e.g., heat source 112) and a second portion 110 is adjacent a second device that absorbs heat (e.g., heat sink 114).

T-OHP 100 are configured such that surface tension force between the pipe 102 and the fluid 106, e.g., at the surface of the internal passage 104, causes the formation of liquid slugs 116 that are interspersed with vapor bubbles 118. As heat is applied to the first portion 108 of the pipe 102, the fluid 106 begins to evaporate which causes an increase of vapor pressure inside the pipe 102 which causes the bubbles 118 in the first portion 108 to grow and push the liquid towards the heat sink 114. As the heat sink 114 absorbs the heat from the fluid 106 and cools the fluid 106, the vapor pressure reduces in the second portion 110 which increases a pressure difference between the first portion 108 and the second portion 110.

The pipe 102 can take any suitable shape, size, and/or configuration for selectively controlling fluid flow therein. For example, the pipe 102 may include one or more curved sections resulting in a serpentine path for flow of the fluid 106, as illustrated in FIG. 1. This can result in the first portion 108 and/or the second portion 110 of the pipe 102 comprising multiple separate parts, such as multiple curved portions in FIG. 1. In another example, the pipe 102 may have an open end where fluid is added or removed as needed.

In a further example, the pipe 102 is a closed loop such that the fluid continuously travels in a loop. Because of the closed loop nature of the pipe 102, a driving force that drives the slugs 116 and the bubbles 118 from the first portion 108 toward the second portion 110, because the growth of the bubbles 118, causes a corresponding restoring force that drives the slugs 116 and bubbles 118 from the second portion 110 toward the first portion 108. The driving force and corresponding restoring force leads to oscillation of the slugs 116 and bubbles 118 in an axial direction and frequency and amplitude of the oscillation can be dependent on shear flow and mass fraction of the fluid 106 in the pipe 102.

However, as noted above, there are times where moving heat from the heat source 112 to the heat sink 114 is inappropriate and/or inopportune. For instance, where the temperature of the heat sink 114 is above a first threshold amount and/or below a second threshold amount, transferring heat to the heat sink 114 cannot be performed appropriately and/or undesirable heat loss at the heat source will occur. To that end, the T-OHP 100 further includes a valve 120 configured to transition between an open position that permits flow of fluid 106 in the pipe 102 and a closed position that limits flow of fluid 106 in the pipe 102.

As will be described in detail below, the valve 120 can take any suitable shape, size, and/or configuration. For instance, the valve 120 can be configured to embed within an internal wall of the pipe 102 (e.g., internal wall 406 in FIG. 4*b*) in the open position. The valve 120 and/or the internal wall can be further shaped such that a portion of the valve 120 forms a part of the internal wall of the pipe 102 in the open position.

The valve 120 can further be shaped to block a portion of the internal passage 104 of the pipe 102 in the closed position to limit flow of fluid 106 at the valve 120. The valve 120 can block any suitable portion of the internal passage 104, such as the entire internal passage 104 and/or only a part thereof. Due to the oscillating nature of the T-OHP 100, limiting and/or outright blocking flow of fluid 106 at the valve 120 can cause a corresponding flow of fluid 106 in other portion(s) of pipe 102 to be limited and/or stopped.

The valve 120 can be placed at any suitable location within the pipe 102, such as the first portion 108, the second portion 110, and/or an adiabatic portion 122 of the pipe 102 that extends between the first portion 108 and the second portion 110. Moreover, the T-OHP 100 may include any suitable number of valves and the number may vary based on size of the pipe 102, the shape of the pipe 102, the fluid 106, and/or the like. In the illustrated embodiment, the T-OHP 100 includes one valve 120 arranged in the first portion 108.

The T-OHP 100 may further include a movement structure configured to move the valve 120 between the open position and the closed position. As will be described in detail below, any suitable movement structure can be utilized, such as mechanically activated structure, passive structure that do not require user activation, and/or the like. The movement structure employed may depend on the valve 120, the pipe 102, the fluid 106, and/or the like.

The T-OHP 100 may further include a control system 124 configured to control a position of the valve 120. The control system 124 can be configured to detect temperature at the heat source 112, temperature at the heat sink 114, temperature at the first portion 108, temperature at the second portion 110, temperature at the adiabatic portion 122, temperature at the valve 120, and/or the like. The control system 124 can then use this information to move the valve 120 as needed to limit fluid flow, such as via the movement structure.

Figure 2:
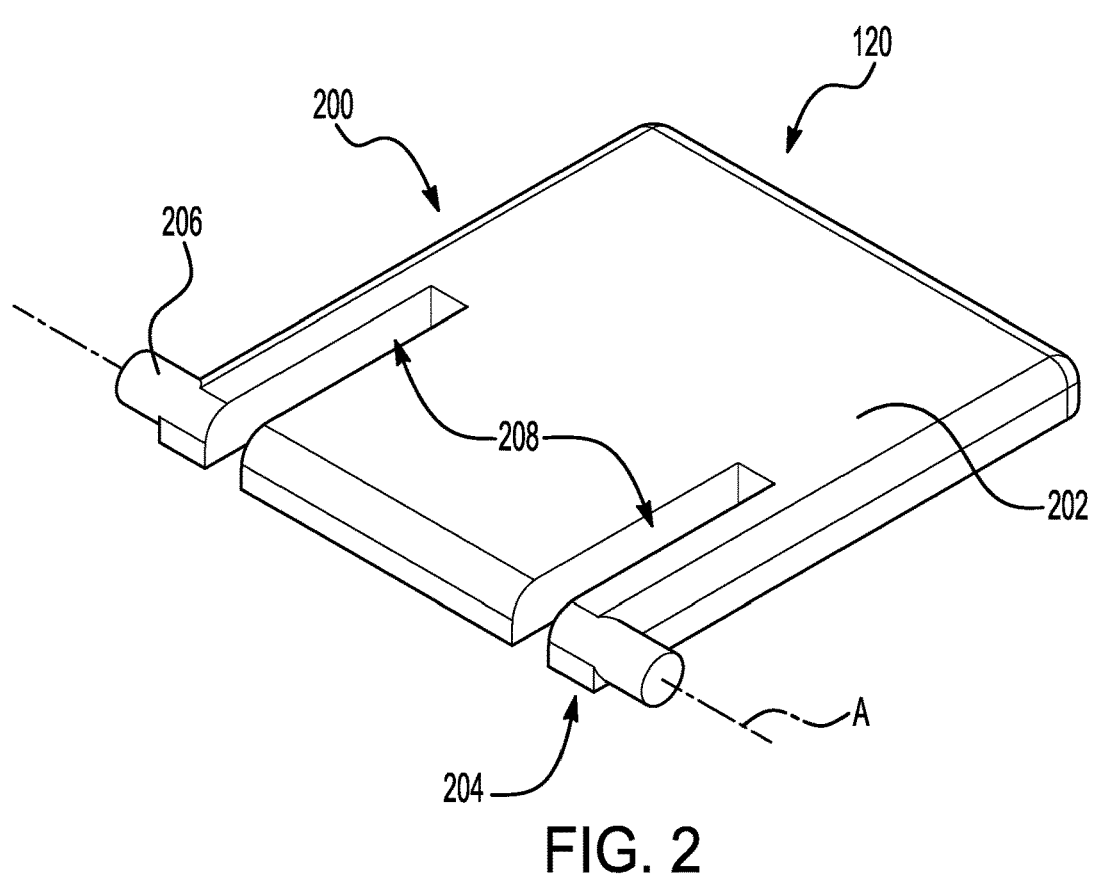
FIG. 2 is a view of a valve body of a shutter-type valve according to an embodiment of the disclosure.

Turning now to FIG. 2, illustrated is one embodiment where the valve 120 is a shutter 200 configured to rotate about rotation axis A when attached to the pipe 102. The illustrated shutter 200 includes a shutter body 202 and attachment structure 204 for rotatably securing the shutter 200 to the pipe 102. The shutter body 202 can have any suitable shape, size, and/or configuration for limiting flow of the fluid 106 in the closed position. For instance, a cross-section of the shutter body 202 may depend on a cross-section of the internal passage 104 and/or the cross-sections may be independent. In the illustrated embodiment, the shutter body 202 has a rectangular cross-section.

Any suitable attachment structure 204 can be used for movably attaching the shutter 200 to the pipe 102 and may depend on the shape and configuration of the pipe 102 and/or the shutter body 202. In the illustrated embodiment, the attachment structure 204 are pins 206 configured to engage corresponding indentations in the pipe 102. In the illustrated embodiment, the attachment structure 204 further includes indentations 208 formed in the shutter body 202 adjacent the pins 206 that permit the shutter body 202 to flex near the root of indentations 208 while the pins 206 are inserted into the corresponding indentations.

Figure 3:
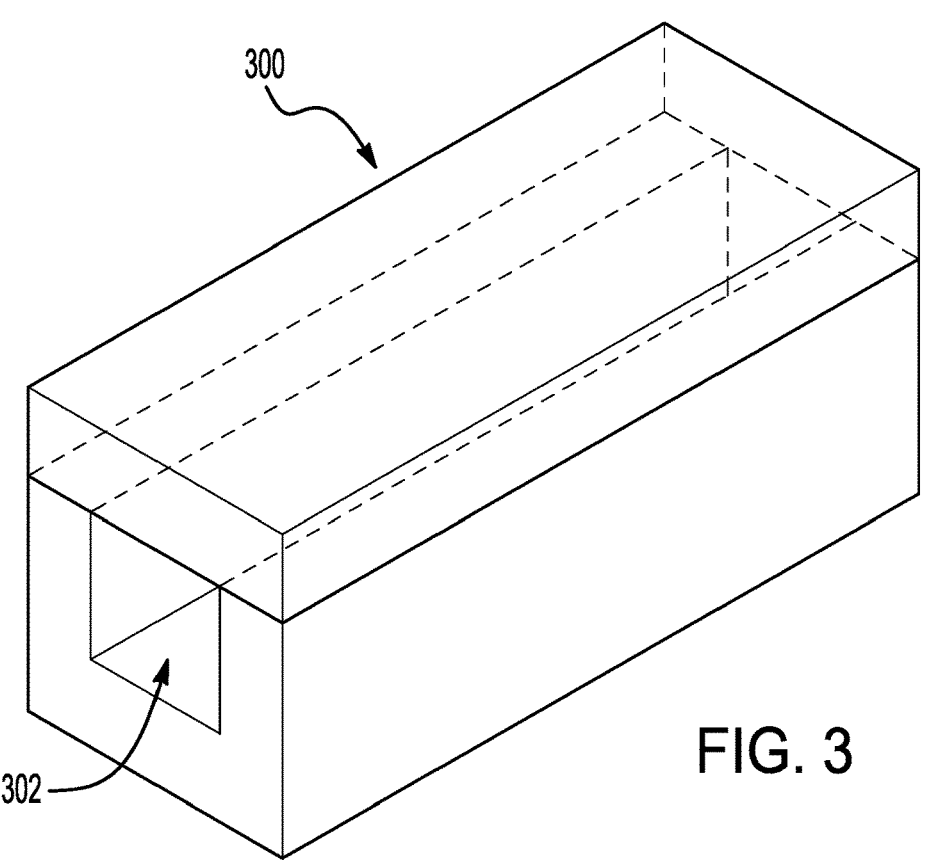
FIG. 3 is a view of the shutter-type valve of FIG. 2 in a section of pipe according to an embodiment of the disclosure.

Illustrated in FIG. 3 is a portion 300 of an embodiment of the pipe 102 shaped for movably holding the shutter 200. The illustrated portion 300 has an internal passage 302 with a rectangular cross-section similar in size to the cross-section of the shutter body 202. The outer surface of the portion 300 can be similar cross-sectional shape to the internal passage 302 and/or can vary. In the illustrated embodiment, the outer surface of the portion 300 also has a rectangular cross-section.

Figures 4A, 4B, 4C, 4D, 4E, 4F:
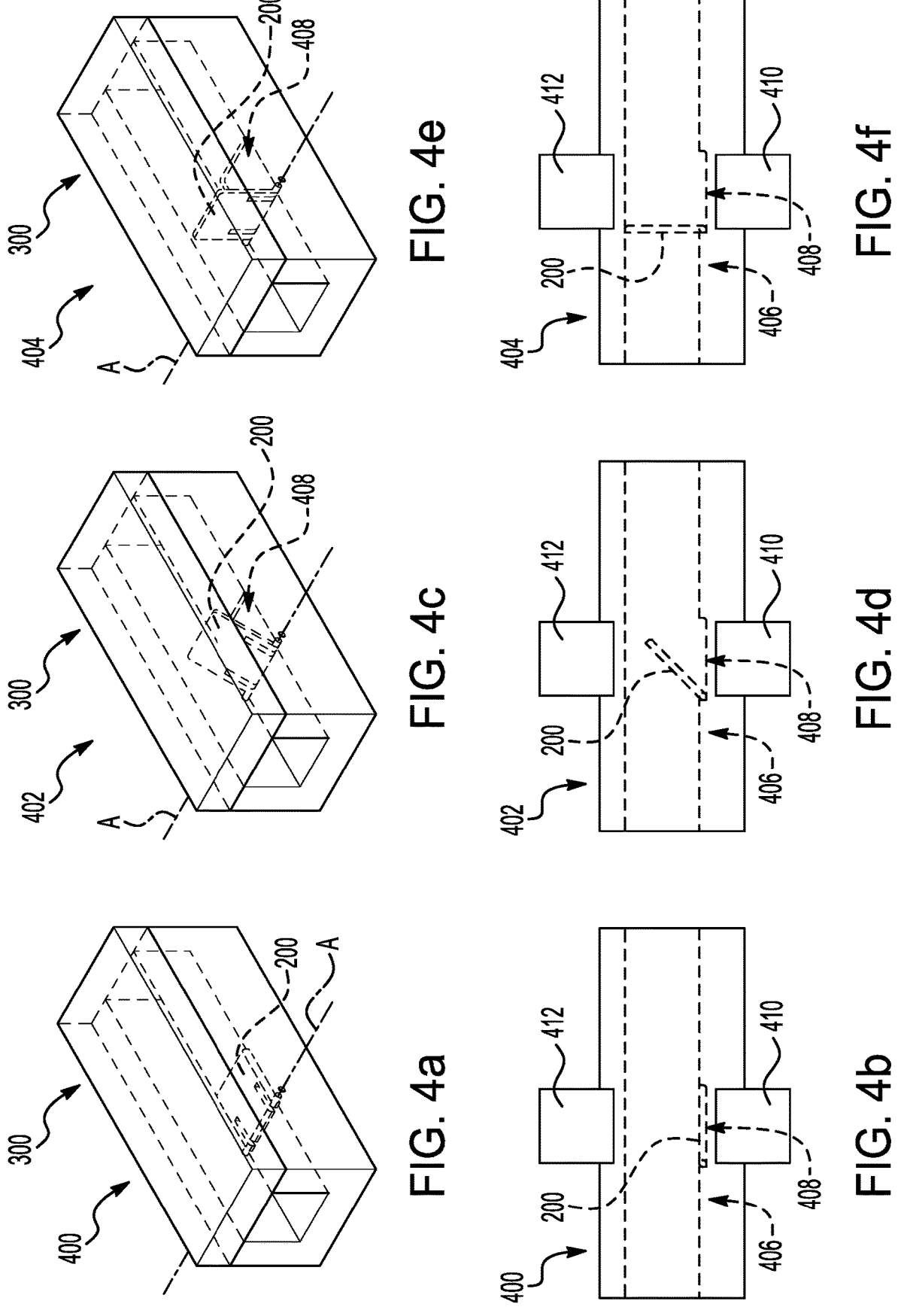
FIGS. 4a-4f are views of the shutter-type valve of FIG. 2 moving between an open position and a closed position according to an embodiment of the disclosure.

Turning now to FIGS. 4*a*-4*f*, illustrated are views of the shutter 200 moving between an open position 400 (FIG. 4*a*) and a closed position 404 (FIG. 4*e*). Moreover, FIGS. 4*a*-4*f* illustrate different views of similar positions. Specifically, FIGS. 4*a* and 4*b* illustrate different views of the shutter 200 in the open position 400, with a portion of the tube 102 removed in FIG. 4*b* for clarity. FIGS. 4*c* and 4*d* illustrate different views of the shutter 200 in an intermediate position 402, with a portion of the tube 102 removed in FIG. 4*d* for clarity. FIGS. 4*e* and 4*f* illustrate different views of the shutter 200 in the closed position 404, with a portion of the tube 102 removed in FIG. 4*f* for clarity.

As previously mentioned above, the shutter 200 and/or the portion 300 of the pipe 102 can be shaped such that the shutter 200 is embedded in a wall 406 of the portion 300 in the closed position. In the illustrated embodiment, the wall 406 includes an indent 408 shaped to receive the shutter 200 and hold the shutter 200 such that a surface of shutter 200 forms a portion of the wall 406 in the open position 400.

As noted above, the T-OHP 100 further includes movement structure configured to move the shutter 200 between the open position 400 and the closed position 404. In the illustrated embodiment, the movement structure comprises a first magnet 410 arranged on a first side of the wall 406 and a second magnet 412 arranged on a second side of the wall 406 that is opposite the first side. The shutter 200 can also include a shutter magnet and/or one or more portions of the shutter 200 can be made of a material that exhibits magnetic interactions, such as ferromagnetic material like iron, cobalt, nickel, and/or the like, and magnets 410 and 412 can be configured to move the shutter 200 by selectively establishing a magnetic field between the first magnet 410 and the shutter magnet and/or between the second magnet 412 and the shutter magnet.

For instance, the first magnet 410 can be configured to establish a magnetic field with the shutter magnet to pull the shutter 200 into the indent 408 and hold the shutter 200 in the open position 400 (seen in FIG. 4*a*). To prevent unintentional movement of the shutter 200, the second magnet 412 can be deactivated while the shutter 200 is in the open position 400. To move the shutter 200 into the closed position, the first magnet 410 can be deactivated and the second magnet 412 can be activated to establish a magnetic connection with the shutter magnet to pull the shutter 200 toward the second magnet 412. Because the shutter 200 is attached to pipe 102 via the pins 206, the shutter 200 rotates about axis A toward the second magnet 412, as seen in the intermediate position 402 (FIG. 4c). The second magnet 412 can be positioned such that the shutter 200 completes the rotation into the closed position 404 (FIG. 4e) and is held in that position by the magnetic connection between the second magnet 412 and the shutter magnet to prevent further forward or backward rotation of the shutter 200. For instance, the second magnet 412 can maintain magnetic connection between the second magnet 412 and the shutter magnet to prevent the shutter 200 from being rotated by pressure from the fluid 106.

The illustrated embodiment includes two magnets 410 and 412, but the T-OHP 100 need not include multiple magnets and a single magnet may be employed. For instance, the single magnet can be used to create both an attracting magnetic connection with the shutter magnet as well as a repelling magnetic connection with the shutter magnet to move the shutter 200 as needed. Moreover, the magnets 410 and 412 can be placed at any suitable location with respect to the portion 300. For instance, the first magnet 410 may be placed adjacent an exterior surface of the portion 300 and/or the first magnet 410 may be embedded in a wall of the portion 300, as illustrated. The arrangement illustrated in FIG. 4b can be either vertical (with the second magnet 412 above the first magnet 410), as illustrated, and/or horizontal with the magnets 410 and 412 on opposite sides of the pipe. For example, the first magnet 410 can be arranged between two serpentine portions of the pipe 102 and the first magnet 410 may be positioned to control both a first valve in a first serpentine portion and a second valve in a second serpentine portion simultaneously. The first magnet 410 and the second magnet 412 may be similarly situated and/or can vary.

Turning now to FIG. 5, illustrated is another embodiment where the valve 120 is a cylinder 500 with an aperture 502 extending through a side of the cylinder 500. The cylinder 500 can be rotationally secured in the pipe 102 such that the aperture 502 is moved rotationally as the cylinder 500 rotates between the open position and the closed position. The aperture 502 can have any suitable cross-section and the cross-section may be uniform along its length and/or can vary. In the illustrated embodiment, the aperture 502 has a uniform rectangular cross-section along its length. Illustrated in FIG. 6 is the cylinder 500 in a portion 600 of the pipe 102. The diameter of the cylinder 500 may be similar in size to a width of internal passage 104 and/or can vary. In the illustrated embodiment, a cross-section of the internal passage 104 is smaller than the size of the cylinder 500 and the portion 600 includes a number of indents to rotatably accommodate the cylinder 500 in the portion 600.

Turning now to FIGS. 7a-7c, illustrated are embodiments of the cylinder 500 rotating between the closed position 700 (FIG. 7a) and the open position 704 (FIG. 7c). In the closed position 700, a central axis X of the aperture 502 of the cylinder 500 is at an angle with respect to a central axis Y of the internal passage 104 in the portion 600 to limit and/or prevent fluid flow in the pipe 102. The central axis X can be at any suitable angle with respect to the central axis Y and may depend on the size of the aperture 502, size of the internal passage 104, and/or the like. In the illustrated embodiment, the central axis X and the central axis Y are perpendicular in the closed portion 700. The cylinder 500 can then be rotated from the closed position 700 to an intermediate position 702 (FIG. 7b) and then to an open position 704. Similar to the closed position 700, the central axis X and the central axis Y can be at any suitable angle in the open position 704. In the illustrated embodiment, the central axis X and the central axis Y are parallel.

As noted above, any suitable mechanism can be used to rotate the cylinder 500. For instance, similar to the shutter 200 above, an exterior magnet(s) can be magnetically coupled to a magnet in the cylinder 500 such that rotation of the exterior magnet causes a corresponding rotation of the cylinder 500. In another example, a mechanical rotor is connected to the cylinder 500 and rotation of the rotor causes rotation of the cylinder 500.

Turning now to FIG. 8, illustrated is another embodiment of the valve 120 including a plunger 800 attached to a spring 802 configured to move the plunger 800 between a closed position and an open position. The plunger 800 can take any suitable shaped and/or size. In the illustrated embodiment, the plunger 800 is cylindrical. The spring 802 can take any suitable configuration and the illustrated spring 802 is a coil spring. Illustrated in FIG. 9 is the plunger 800 and spring 802 combination in a portion 900 of the pipe 102 shaped for the plunger 800 and spring 802. The illustrated portion 900 includes a depression, recess, and/or indent (hereafter indent 902) that extends into the wall adjacent the internal passage 104 to receive the spring 802 to hold a portion of the plunger 800 in the indent 902 in the open position and to press a portion of the plunger 800 into the internal passage 104 in the closed position.

Illustrated in FIGS. 10a-10d is the plunger 800 moving between an open position 1000 (FIGS. 10a and 10b) and a closed position 1002 (FIGS. 10c and 10d). FIGS. 10a and 10b illustrated the same open position 1000 with a portion of the tube 102 removed in FIG. 10b for clarity. FIGS. 10c and 10d illustrate the same closed position 1002 with a portion of the tube 102 removed in FIG. 10d for clarity. In the illustrated open position 1000, the indent 902 is shaped such that the compressed spring 802 and the plunger 800 are entirely contained in the indent 902 in the open position 1000. In the illustrated closed position 1002, the spring 802 extends to press the plunger 800 into the internal passage 104 and block fluid flow therein. The plunger 800 can extend into any suitable portion of the internal passage 104 and in the illustrated embodiment, the plunger 800 extends across the entire internal passage 104 with a portion of the plunger 800 remaining in the indent 902 to completely block fluid flow in the internal passage 104 in the closed position 1002. The portion of the plunger 800 remaining in the indent 902 can be used to maintain alignment of the plunger 800 with the indent 902 in the closed position 1002.

Any suitable structure(s) can be used to cause the spring 802 to expand and compress as needed to move the plunger 800. In one exemplary embodiment, the spring 802 is made of a thermally activated material configured to change shape, size, and/or configuration in response to detecting a predetermined temperature(s) and/or predetermined temperature range(s). For instance, the material can exhibit a shape memory effect and superelasticity at different temperatures, such as nickel titanium (nitinol). For instance, the spring 802 is initially in the compressed position (e.g., the open position 1000) and the spring 802 undergoes deformation into the expanded position (e.g., the closed position 1002) when the spring 802 is above a predetermined threshold temperature. The predetermined threshold temperature can be selected based on any suitable factor, such as characteristics of the fluid 106, the material of the spring 802, characteristics of the heat source 112 or heat sink 114, characteristics of where the T-OHP 100 is used, and/or the like.

Figures 11, 12, 13A, 13B, 13C, 13D:
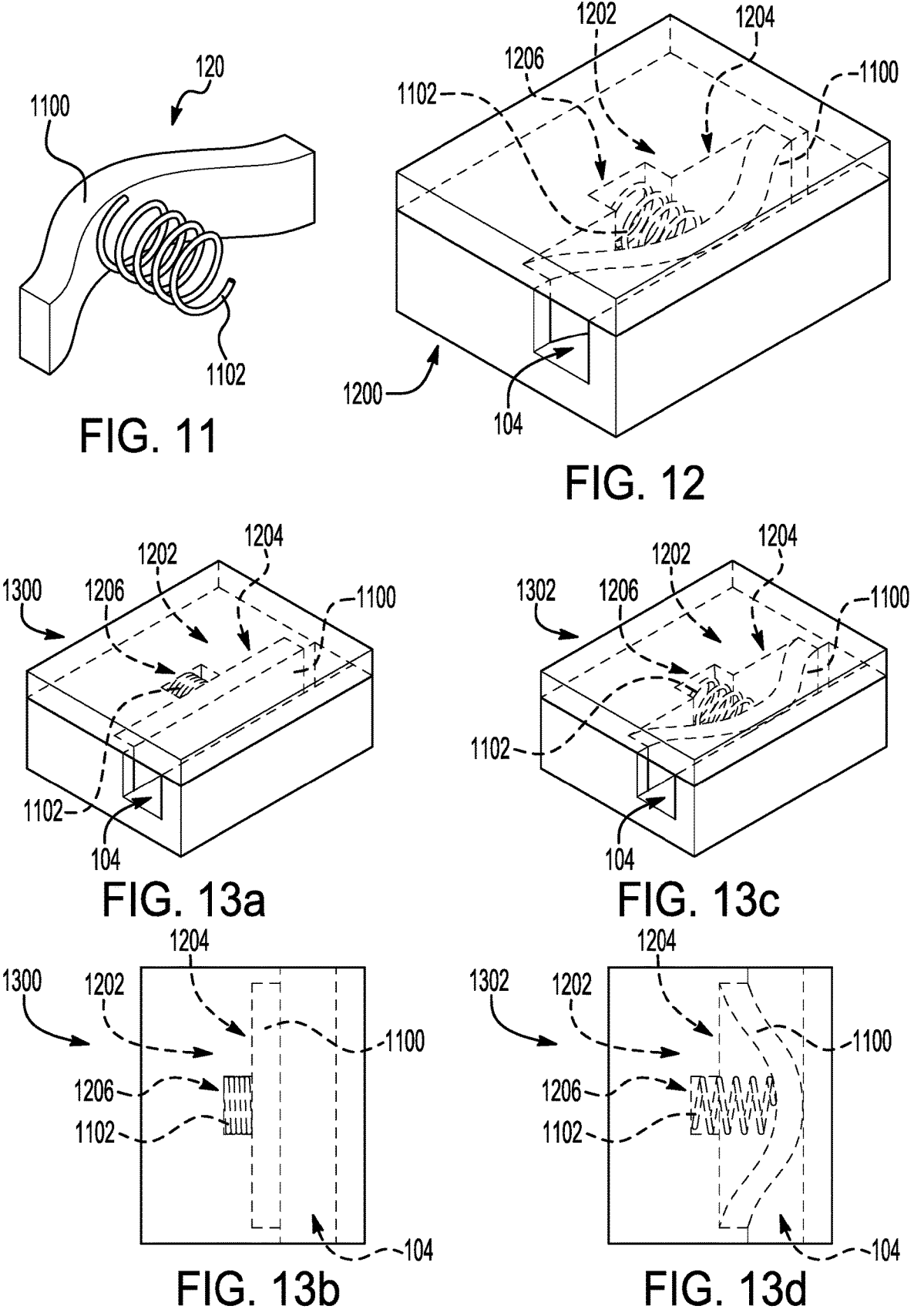
FIG. 11 is a view of a flexible wall type valve according to another embodiment of the disclosure.
FIG. 12 is a view of the flexible wall type valve of FIG. 11 in a section of pipe according to a further embodiment of the disclosure.
FIGS. 13a-13d are views of the flexible wall type valve of FIG. 11 moving between an open portion and a closed position according to a further embodiment of the disclosure.

Turning now to FIG. 11, illustrated is another embodiment of the valve 120 including a flexible wall 1100 attached to a spring 1102 configured to move the flexible wall 1100 between a closed position and an open position. The flexible wall 1100 can take any suitable shaped and/or size. In the illustrated embodiment, the flexible wall 1100 has a rectangular cross-sectional shape. The spring 1102 can take any suitable configuration and the illustrated spring 1102 is a coil spring. Illustrated in FIG. 12 is the flexible wall 1100 and spring 1102 combination in a portion 1200 of the pipe 102 shaped for the flexible wall 1100 and spring 1102. The illustrated portion 1200 includes a depression, recess, and/or indent (hereafter indent 1202) that extends into the wall adjacent the internal passage 104 to receive at least a portion of the flexible wall 1100 and/or the spring 1102. The indent 1202 can take any suitable shape and/or cross-sectional area, in the illustrated embodiment, the indent 1102 includes a first portion 1204 with a first cross-sectional area to receive the flexible wall 1100 and a second portion 1206 with a second cross-sectional area to receive the spring 1102. The indent 1202 and/or the flexible wall 1100 can be further configured to anchor one or more portions of the flexible wall 1100 in the indent 1202 while the wall 1100 flexes.

Illustrated in FIGS. 13a-13d is the flexible wall 1100 moving between an open position 1300 (FIGS. 13a and 13b) and a closed position 1302 (FIGS. 13c and 13d). FIGS. 13a and 13b illustrated the same open position 1300 with a portion of the tube 102 removed in FIG. 13b for clarity. FIGS. 13c and 13d illustrate the same closed position 1302 with a portion of the tube 102 removed in FIG. 13d for clarity. In the illustrated open position 1300, the indent 1202 is shaped such that the flexible wall 1100 is entirely retained within the first portion 1204 to form a portion of the wall of the internal passage 104 and the compressed spring 1102 is entirely retained within the second portion 1206. In the illustrated closed position 1302, the flexible wall 1100 and/or the spring 1102 extends into a portion of the internal passage 104 to block fluid flow therein. In the illustrated closed position 1302, the flexible wall 1100 extends to block the entire internal passage 104 and the spring 1102 extends out of the indent 1202 into the internal passage 104.

Any suitable structure(s) can be used to flex the wall 1100 to block the portion of the internal passage 104. In one embodiment, the wall 1100 is made of a shape memory material (e.g., nitinol) and the spring 1102 comprises a compression spring held in a compressed position by a spring force. Above a threshold temperature the wall 1100 deforms into the closed position 1302 and the deformation exceeds the spring force which pulls the spring 1102 out of the compressed position and into the internal passage. Below the threshold temperature, the wall 1100 returns to at least partially a non-deformed state and the spring force of the spring 1102 holds the flexible wall 1100 in the open position 1300. In another embodiment, similar to spring 802 described above, the spring 1102 can be made of the thermally activated material and the wall 1100 flexes in response to deformations in the spring 802. In a yet further embodiment, the wall 1100 can include a wall magnet or a magnetic material portion and a separate magnet is used to establish a magnetic field with the wall magnet or magnetic material portion to flex the wall 1100. In yet another embodiment, opposing flexible walls 1100, with or without corresponding springs 1102, can be employed and configured to flex to meet in the internal passage 104 and block fluid flow therein.

In another exemplary embodiment, an elastic spring 802 is used and a separate component is used to compress and/or expand the spring 802 as needed. For instance, illustrated in FIG. 14, the spring 802 may be biased toward the compressed position and a magnet 1400 is arranged across the internal passage 104 from the plunger 800. In the open position 1000, the magnet 1400 is deactivated and in the closed position 1002, the magnet 1400 is activated to establish an attractive force between the magnet 1400 and a corresponding magnet or ferromagnetic material portion in the plunger 800. The attractive force can be configured to overcome the spring force of the spring 802 to pull the plunger 800 into the internal passage 104. However, this can be vice-versa, with the spring 802 biased toward the closed position 1002 and the magnet 1400 establishes a repelling force with the plunger 800 to drive the plunger 800 into the open position 1000 against the spring bias.

Figures 14, 15:
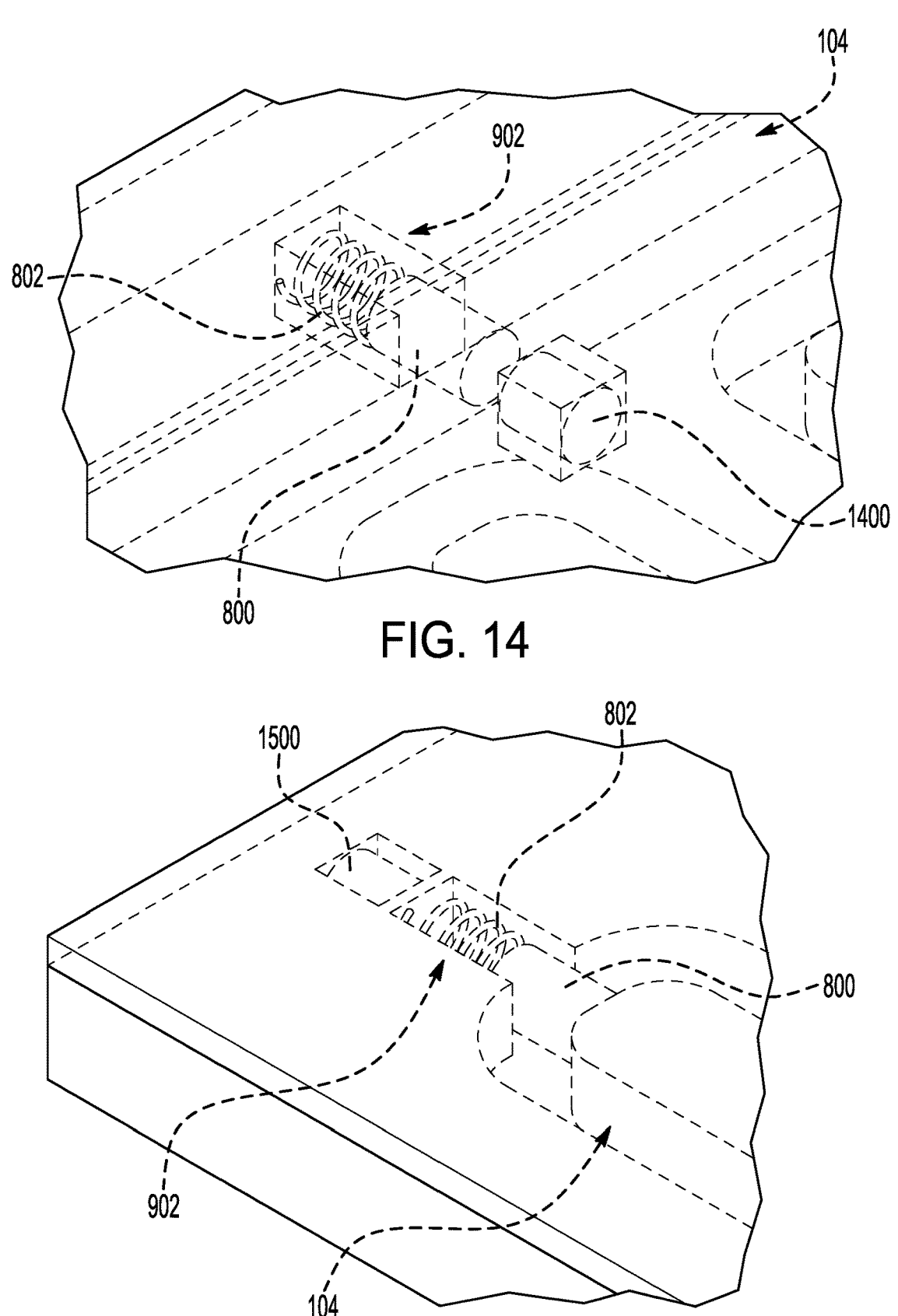
FIG. 14 is a view of a first arrangement of the plunger-type valve of FIG. 8 according to an embodiment of the disclosure.
FIG. 15 is a view of a second arrangement of the plunger-type valve of FIG. 8 according to another embodiment of the disclosure.

In another instance, illustrated in FIG. 15, the spring 802 may be biased toward the closed position 1002, and a magnet 1500 may be arranged adjacent the spring 802. In the closed position 1002, the magnet 1500 is deactivated and the spring 802 holds the plunger 800 in the internal passage 104. To move the plunger 800 into the open position 1000, the magnet 1500 is activated to establish an attractive force with the corresponding magnet or magnetic material portion in the plunger 800 to pull the plunger 800 toward the magnet 1500 overcoming the spring bias of the spring 802. Similarly, this arrangement can also be vice versa, with the spring 802 biased toward the open position 1000, and the magnet 1500 establishes a repelling force with the plunger 800 to drive the plunger 800 into the closed position 1002 against the spring bias.

Figures 16, 17:
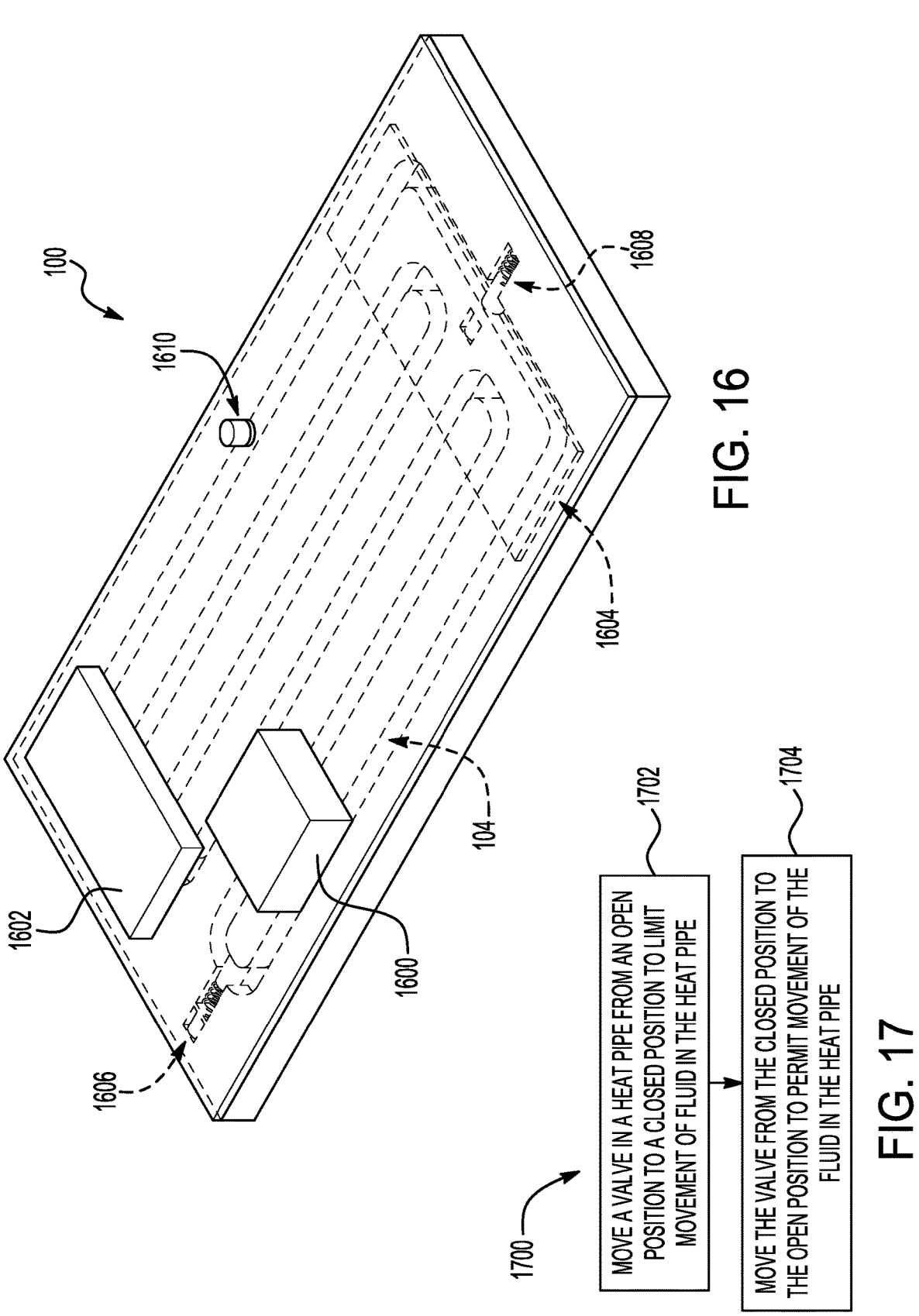
FIG. 16 is a view of a tunable oscillating heat pipe system with movable valves according to another embodiment of the disclosure.
FIG. 17 is a high-level flow chart of a method according to an embodiment of the disclosure.

As briefly mentioned above, the T-OHP 100 may include a plurality of heat sources 112, heat sinks 114, and/or valves 120. Illustrated in FIG. 16 is an T-OHP 100 with a first heat source 1600 and a second heat source 1602 that share a similar heat sink 1604. The first heat source 1600, the second heat source 1602, and the heat sink 1604 can be in any suitable arrangement in the T-OHP 100, and in the illustrated embodiment, the heat sink 1604 is arranged at a first end of the T-OHP body and the first heat source 1600 is arranged along a first part of the pipe 102 and the second heat source 1602 arranged along a second part of the pipe 102 spaced form the first part.

The T-OHP 100 can include any suitable number of valves 120 in any suitable arrangement and different arrangements can be used for different configurations of the T-OHP 100. For instance, in the embodiment illustrated in FIG. 13, the T-OHP 100 includes a first valve 1606, a second valve 1608, and a third valve 1610 that are arranged at different points along the path of the internal passage 104 to control flow at different parts of the internal passage 104. The first valve 1606 is arranged adjacent the first heat source 1600, the second valve 1608 is arranged in the heat sink 1604, and the third valve 1610 is arranged along a part of the path between the second heat source 1602 and the heat sink 1604. The different valves can be selectively moved between closed and opened positions to select what is in communication. For instance, the second valve 1608 can be closed to stop communication between the first heat source 1600, the second heat source 1602, and the heat sink 1604. In another instance, the first valve 1606 can be closed to stop and/or limit communication between the first heat source 1600 and the heat sink 1604 while allowing some communication between the second heat source 1602 and the heat sink 1604. In a further instance, the third valve 1610 can be closed to stop and/or limit communication between the second heat 1602 and the heat sink 1604 while allowing some communication between the first heat source 1600 and the heat sink 1604.

The first valve 1606, the second valve 1608, and the third valve 1610 may be similar and/or can vary. For instance, the first valve 1606 may be passive with a thermally deforming material, while the second valve 1608 may be active and rely on the control system 124 to move the second valve 1608. In the illustrated embodiment, the first valve 1606, the second valve 1608, and the third valve 1610 are different.

FIG. 17 shows a high-level flow of a method 1700 of operating a T-OHP 100 (FIG. 1). In step 1702, a valve arranged in an internal passage of a heat pipe of the oscillating heat pipe is moved from an open position to a closed position as a function of at least one of temperature at a first portion of the pipe, temperature at a second portion of the pipe, or temperature at the valve. In the open position the valve is arranged to permit movement of fluid in the internal passage. In the closed position the valve is arranged in the internal passage to limit movement of the fluid in a part of the internal passage. In step 1704, the valve is moved from the closed position to the open position to permit movement of the fluid in the internal passage again as a function of at least one of temperature at a first portion of the pipe, temperature at a second portion of the pipe, or temperature at the valve.

Although the disclosure shows and describes certain preferred embodiment or embodiments, it is obvious that equivalent alterations and modifications will occur to others skilled in the art upon the reading and understanding of this specification and the annexed drawings. In particular regard to the various functions performed by the above described elements (external components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A tunable oscillating heat pipe system comprising:
a passive oscillating closed loop heat pipe configured for movement of a fluid in an internal passage in the closed loop to transfer heat from a first portion of the closed loop to a second portion; and
a valve arranged in a section of the internal passage, wherein the valve is movable between an open position and a closed position, wherein in the open position the valve is arranged to permit movement of the fluid in the internal passage, wherein in the closed position the valve is arranged in the internal passage to limit movement of the fluid in a part of the internal passage, wherein movement of the valve between the open position and the closed position is a function of at least one of temperature at the first portion, temperature at the second portion, or temperature at the valve.

2. The heat pipe system of claim 1, further including a magnet configured to selectively generate a magnetic field between the magnet and a corresponding valve magnet or magnetic material portion of the valve to move the valve.

3. The heat pipe system of claim 2, further including a second magnet configured to selectively generate a second magnetic field between the second magnet and the valve magnet or magnetic material portion of the valve to move the valve,
wherein the magnet and the second magnet are configured to alternatingly generate the magnetic field and the second magnetic field to move the valve between the open position and the closed position.

4. The heat pipe system of claim 1, wherein the heat pipe forms a serpentine flow path for the fluid.

5. The heat pipe system of claim 1, wherein the valve is a shutter that rotates about a pivot point between the open position and the closed position, wherein the shutter in the open position is perpendicular to the shutter in the closed position.

6. The heat pipe system of claim 1, wherein the valve is a cylinder capable of rotation with an aperture extending therethrough.

7. The heat pipe system of claim 6, wherein a central axis of the aperture is aligned with a fluid flow path of the section of the closed loop heat pipe in the open position, wherein the central axis of the aperture is perpendicular to the fluid flow path of the section of the closed loop heat pipe in the closed position.

8. The heat pipe system of claim 1, wherein the valve is a plunger attached to a spring, wherein the spring is compressed in the open position, wherein the spring is expanded in the closed position.

9. The heat pipe system of claim 8, wherein the spring is made of thermally activated material configured to expand or contract in response to a temperature of the spring being above a predetermined threshold.

10. The heat pipe system of claim 8, wherein an internal wall of the closed loop heat pipe includes a notch in the section of the internal passage of the closed loop heat pipe, wherein the plunger and spring are entirely held in the notch in the open position.

11. The heat pipe system of claim 1, wherein the section of the internal passage has a first cross-sectional area, wherein the valve has a second cross-sectional area.

12. The heat pipe system of claim 11, wherein the first cross-sectional area and the second cross-sectional area are the same such that the valve in the closed position completely blocks the section of the internal passage.

13. The heat pipe system of claim 1, further comprising a second valve arranged in a second section of the internal passage, wherein the second valve is movable between a second open position and a second closed position as a function of at least one of temperature at the first portion or temperature at the second portion.

14. A tunable oscillating heat pipe system comprising:
a heat source;
a heat sink configured to absorb heat;
a passive oscillating closed loop heat pipe with a first portion of the heat pipe arranged adjacent the heat source and a second portion of the heat pipe arranged adjacent the heat sink, wherein the heat pipe configured for movement of a fluid in an internal passage in the closed loop to transfer heat from a first portion of the closed loop to a second portion; and
a valve arranged in a section of the internal passage, wherein the valve is movable between an open position and a closed position, wherein in the open position the valve is arranged to permit movement of the fluid in the internal passage, wherein in the closed position the valve is arranged in the internal passage to limit movement of the fluid in a part of the internal passage, wherein movement of the valve between the open position and the closed position is a function of at least one of temperature at the first portion, temperature at the second portion, or temperature at the valve.

15. The heat pipe system of claim 14, further comprising a second heat source, wherein the heat pipe has a third portion arranged adjacent the second heat source, wherein the valve is arranged to limit movement of the fluid between the heat source and the heat sink.

16. The heat pipe system of claim 14, further comprising a control system configured to move the valve between the open position and the closed position as the function of at least one of temperature at the first portion or temperature at the second portion.

17. The heat pipe system of claim 14, further comprising a second heat sink configured to absorb heat, wherein the heat pipe has a third portion arranged adjacent the second heat sink, wherein the valve is arranged to limit movement of the fluid between the heat source and the heat sink.

18. A method of operating a tunable oscillating heat pipe system comprising:

moving a valve arranged in an internal passage of a heat pipe of the oscillating heat pipe from an open position to a closed position as a function of at least one of temperature at a first portion of the pipe, temperature at a second portion of the pipe, or temperature at the valve, wherein in the open position the valve is arranged to permit movement of fluid in the internal passage, wherein in the closed position the valve is arranged in the internal passage to limit movement of the fluid in a part of the internal passage; and moving the valve from the closed position to the open position to permit movement of the fluid in the internal passage again as a function of a temperature at the valve.

19. The method of claim 18, wherein moving the valve from the open position to the closed position includes activating a magnet to generate a magnetic field between the magnet and a corresponding valve magnet or magnetic material portion of the valve to move the valve.

20. The method of claim 19, wherein moving the valve from the closed position to the open position includes activating a second magnet to generate a second magnetic field between the second magnet and the corresponding valve magnet or magnetic material portion of the valve to move the valve.

* * * * *